US012394995B2

(12) United States Patent
Chiang et al.

(10) Patent No.: US 12,394,995 B2
(45) Date of Patent: Aug. 19, 2025

(54) INTERNET OF THINGS DEVICE AND BATTERY POWER SUPPLY CIRCUIT THEREOF

(71) Applicant: Sercomm Corporation, Taipei (TW)

(72) Inventors: Meng-Chien Chiang, Taipei (TW); Yu Ping Hsu, Taipei (TW)

(73) Assignee: Sercomm Corporation, Taipei (TW)

( * ) Notice: Subject to any disclaimer, the term of this patent is extended or adjusted under 35 U.S.C. 154(b) by 820 days.

(21) Appl. No.: 17/701,705

(22) Filed: Mar. 23, 2022

(65) Prior Publication Data

US 2023/0020200 A1   Jan. 19, 2023

(30) Foreign Application Priority Data

Jul. 16, 2021   (CN) .......................... 202110806459.0

(51) Int. Cl.
*H02J 7/00*   (2006.01)
*H02H 1/00*   (2006.01)
(Continued)

(52) U.S. Cl.
CPC ....... *H02J 7/00306* (2020.01); *H02H 1/0007* (2013.01); *H02H 3/06* (2013.01); *H02H 3/243* (2013.01); *H02H 7/18* (2013.01); *H02J 7/0031* (2013.01); *H02J 7/0063* (2013.01); *H02J 7/007182* (2020.01)

(58) Field of Classification Search
USPC ........................................................ 320/136
See application file for complete search history.

(56) References Cited

U.S. PATENT DOCUMENTS 5,477,124 A * 12/1995 Tamai ..................... H02H 7/18
                                                        320/135
6,271,605 B1   8/2001 Carkner et al.
(Continued)

FOREIGN PATENT DOCUMENTS

CN   106130117   11/2016
CN   108063469    5/2018
(Continued)

OTHER PUBLICATIONS

"Office Action of China Counterpart Application", issued on Jul. 2, 2024, p. 1-p. 7.

*Primary Examiner* — Drew A Dunn
*Assistant Examiner* — Ahmed H Omar
(74) *Attorney, Agent, or Firm* — JCIPRNET

(57) ABSTRACT

The disclosure provides an Internet of things device and a battery power supply circuit thereof. A voltage of a battery is compared with a predetermined over-discharge voltage to generate a comparison signal. A battery protection circuit serves as a power supply path from the battery to a load and determines whether to cut off the power supply path according to the comparison signal. The battery protection circuit cuts off the power supply path when the voltage of the battery decreases from a value greater than the predetermined over-discharge voltage to a value less than the predetermined over-discharge voltage, but does not turn on the power supply path when the voltage of the battery increases from a value less than the predetermined over-discharge voltage to a value greater than the predetermined over-discharge voltage.

10 Claims, 3 Drawing Sheets

(51) Int. Cl.
*H02H 3/06* (2006.01)
*H02H 3/24* (2006.01)
*H02H 7/18* (2006.01)

(56) References Cited

U.S. PATENT DOCUMENTS

| | | | | |
|---|---|---|---|---|
| 2002/0089308 A1* | 7/2002 | Sakurai | ............... | H02J 7/0047 |
| | | | | 320/134 |
| 2004/0090726 A1* | 5/2004 | Ball | ............ | H02H 9/001 |
| | | | | 361/93.9 |

FOREIGN PATENT DOCUMENTS

| | | |
|---|---|---|
| CN | 207939230 | 10/2018 |
| CN | 109672234 | 4/2019 |
| CN | 109904901 | 6/2019 |
| CN | 107946678 | 11/2019 |
| CN | 112271772 | 1/2021 |

\* cited by examiner

INTERNET OF THINGS DEVICE AND BATTERY POWER SUPPLY CIRCUIT THEREOF

CROSS-REFERENCE TO RELATED APPLICATION

This application claims the priority benefit of Chinese application no. 202110806459.0, filed on Jul. 16, 2021. The entirety of the above-mentioned patent application is hereby incorporated by reference herein and made a part of this specification.

BACKGROUND

Technical Field

The disclosure relates to an electronic device. In particular, the disclosure relates to an Internet of things device and a battery power supply circuit thereof.

Description of Related Art

Generally speaking, batteries used by an Internet of things (IoT) device are mostly primary batteries. Therefore, it is mainly necessary to monitor a discharge state of a battery to prevent overheating of the battery due to continuous discharge of the battery in a low voltage over-discharge region. Overheating of the battery shortens the life of the battery, and even causes a fire, leading to safety issues. Therefore, it's necessary to ensure that the battery is not discharged in an over-discharge region.

SUMMARY

The disclosure provides an IoT device and a battery power supply circuit thereof that ensures safety of a battery.

According to an embodiment of the disclosure, a battery power supply circuit includes a battery, a comparison circuit, and a battery protection circuit. The comparison circuit is coupled to the battery and compares a voltage of the battery with a predetermined over-discharge voltage to generate a comparison signal. The battery protection circuit serves as a power supply path from the battery to a load and determines whether to cut off the power supply path according to the comparison signal. The battery protection circuit cuts off the power supply path from the battery to the load when the voltage of the battery decreases from a value greater than the predetermined over-discharge voltage to a value less than the predetermined over-discharge voltage, but does not turn on the power supply path when the voltage of the battery increases from a value less than the predetermined over-discharge voltage to a value greater than the predetermined over-discharge voltage.

According to an embodiment of the disclosure, an IoT device includes a communication circuit and a battery power supply circuit. The battery power supply circuit supplies power to the communication circuit. The battery power supply circuit includes a battery, a comparison circuit, and a battery protection circuit. The comparison circuit is coupled to the battery and compares a voltage of the battery with a predetermined over-discharge voltage to generate a comparison signal. The battery protection circuit serves as a power supply path from the battery to the communication circuit and determines whether to cut off a power supply path according to the comparison signal. The battery protection circuit cuts off the power supply path from the battery to the communication circuit when the voltage of the battery decreases from a value greater than the predetermined over-discharge voltage to a value less than the predetermined over-discharge voltage, but does not turn on the power supply path when the voltage of the battery increases from a value less than the predetermined over-discharge voltage to a value greater than the predetermined over-discharge voltage.

Based on the foregoing, the battery protection circuit effectively prevents a voltage rebound of the battery from causing the battery to over-discharging again, and effectively improves the safety of the battery.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
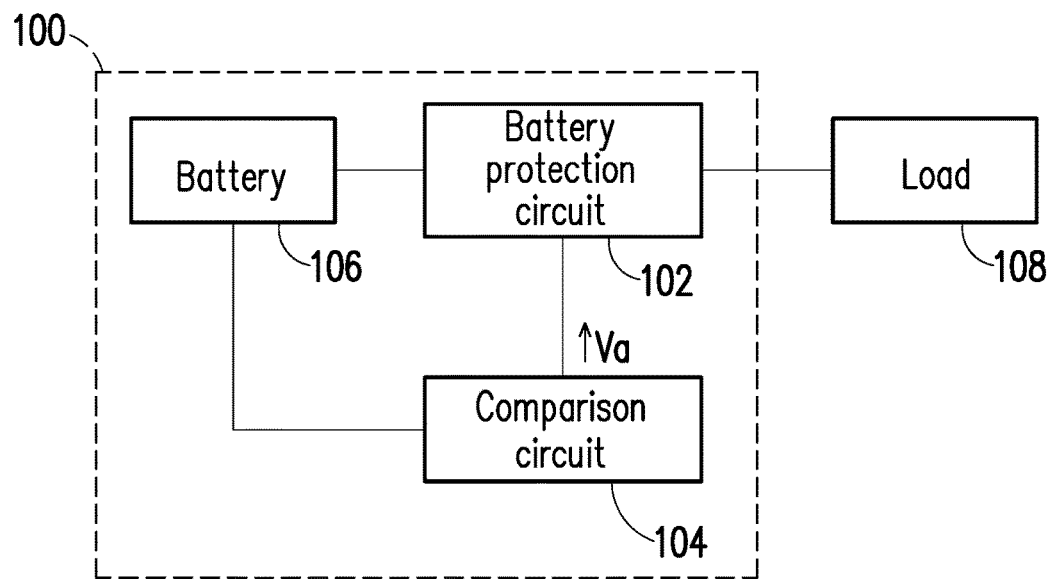
FIG. 1 is a schematic diagram of a battery power supply circuit according to an embodiment of the disclosure.

FIG. 1 is a schematic diagram of a battery power supply circuit according to an embodiment of the disclosure. With reference to FIG. 1, a battery power supply circuit 100 may include a battery protection circuit 102, a comparison circuit 104, and a battery 106. The battery protection circuit 102 is coupled to the battery 106, the comparison circuit 104, and a load 108. The comparison circuit 104 is also coupled to the battery 106. The battery 106 may be, for example but not limited to, a primary battery. The battery 106 may supply power to the load 108 through the battery protection circuit 102. The comparison circuit 104 may compare a voltage discharged by the battery 106 with a predetermined over-discharge voltage to generate a comparison signal Va. The battery protection circuit 102 may determine whether to cut off a power supply path from the battery 106 to the load 108 according to the comparison signal Va. For example, the battery protection circuit 102 may cut off the power supply path from the battery 106 to the load 108 when the voltage of the battery decreases from a value greater than the predetermined over-discharge voltage to a value less than the predetermined over-discharge voltage, to prevent the battery 106 from discharging.

In addition, the battery protection circuit 102 also does not turn on the power supply path from the battery 106 to the load 108 after the voltage of the battery increases from a value less than the predetermined over-discharge voltage to a value greater than the predetermined over-discharge voltage. Accordingly, when the voltage of the battery 106 rebounds back above the predetermined over-discharge voltage as the load 108 no longer loads the battery 106, the battery protection circuit 102 still does not turn on the power supply path from the battery 106 to the load 108. This could prevent the battery 106 from entering the over-discharge region again. The mechanism above prevents the battery 106 from repeatedly entering the over-discharge region, thus improving the safety.

In some embodiments, the comparison circuit 104 may also compare a temperature of the battery 106 (or around the battery) with a predetermined temperature to generate the comparison signal Va. When the temperature of the battery 106 is greater than the predetermined temperature, the battery protection circuit 102 may cut off the power supply path from the battery 106 to the load 108 according to the comparison signal Va, further improving the safety.

Figure 2:
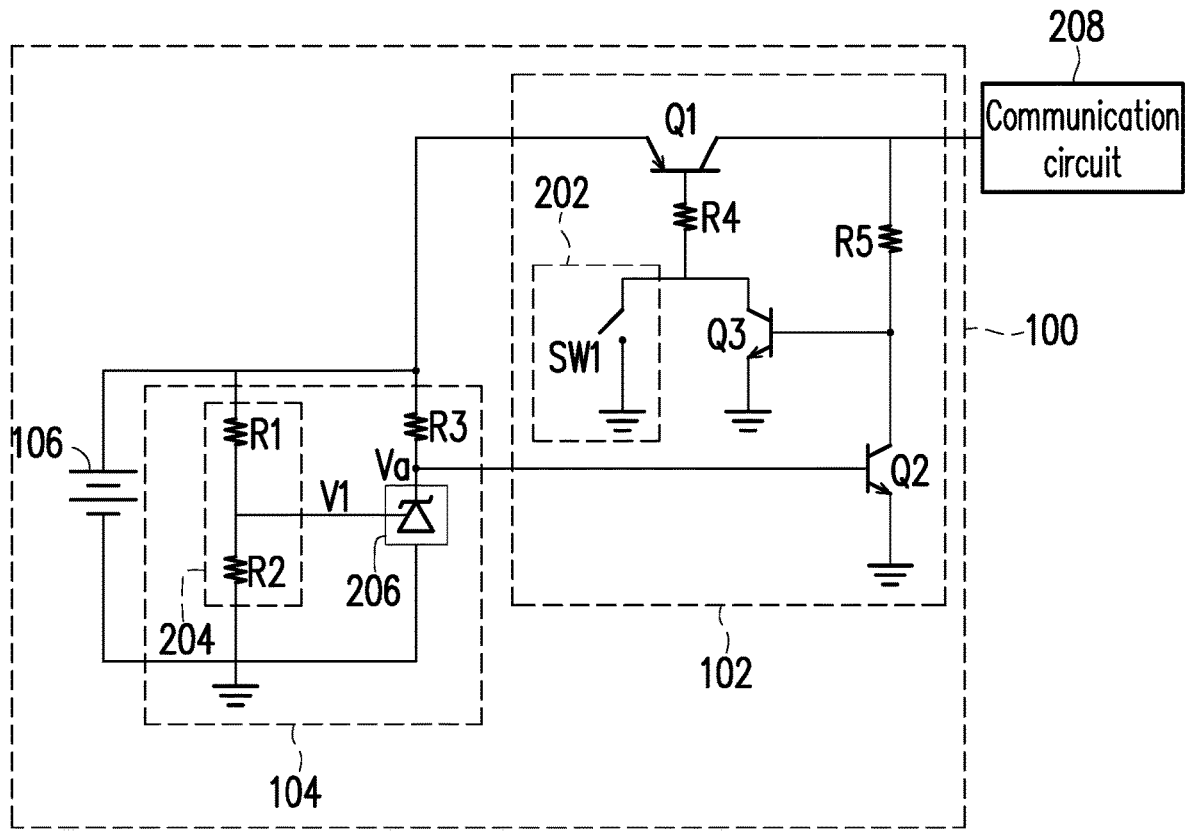
FIG. 2 is a schematic diagram of an IoT device according to an embodiment of the disclosure.

FIG. 2 is a schematic diagram of an IoT device according to an embodiment of the disclosure. In this embodiment, the battery power supply circuit 100 is applied to an IoT device, and the load 108 in the embodiment of FIG. 1 may be, for example but not limited to, a communication circuit 208 of the IoT device in this embodiment. In addition, the battery protection circuit 102 may include a power supply control circuit 202, a PNP transistor Q1, NPN transistors Q2, Q3, and resistors R4, R5. The comparison circuit 104 may include a voltage-dividing circuit 204, a resistor R3, and a three-terminal voltage regulator 206.

The PNP transistor Q1 has an emitter terminal and a collector terminal respectively coupled to the battery 106 and the communication circuit 208. The resistor R4 is coupled between a base terminal of the PNP transistor Q1 and the power supply control circuit 202. The NPN transistor Q3 has a collector terminal and an emitter terminal respectively coupled to the resistor R4 and a ground, and a base terminal coupled to a collector terminal of the NPN transistor Q2. The resistor R5 is coupled between the collector terminal of the PNP transistor Q1 and the collector terminal of the NPN transistor Q2. The NPN transistor Q2 has a base terminal coupled to an output terminal of the comparison circuit SW1/104 (i.e., a cathode terminal of the three-terminal voltage regulator 206), and an emitter terminal coupled to a ground. In addition, in the comparison circuit 104, the voltage-dividing circuit 204 is coupled to the battery 106 and a reference terminal of the three-terminal voltage regulator 206. The three-terminal voltage regulator 206 has a cathode terminal and an anode terminal respectively coupled to the base terminal of the NPN transistor Q2 and a ground. The resistor R3 is coupled between the battery 106 and the cathode terminal of the three-terminal voltage regulator 206. The three-terminal voltage regulator 206 may be embodied as, for example but not limited to, a TL431 chip.

The power supply control circuit 202 may turn on the PNP transistor Q1 in response to a power supply control signal. In this embodiment, the power supply control circuit 202 may be embodied as a power switch SW1. The power switch SW1 may be controlled by the power supply control signal to enter the ON state to pull down a voltage of the base terminal of the PNP transistor Q1 and turn on the PNP transistor Q1. The power supply control signal may be provided to the power switch SW1, for example, in response to a pressing operation of a user on a power button to turn on the power switch SW1. The power button may be a physical button or a virtual button displayed on a touch display. After the PNP transistor Q1 enters the ON state and then enters the OFF state, the power switch SW1 is returned to the OFF state in response to ending of the pressing operation. After the power switch SW1 is returned to the OFF state, the NPN transistor Q3 may enter the ON state with the PNP transistor Q1 being turned on. In addition, the state of the NPN transistor Q2 is controlled by the comparison signal Va output by the comparison circuit 104. When the battery 106 has not entered the over-discharge region and supplies power normally, the NPN transistor Q2 is in the OFF state. Accordingly, when the battery 106 has not entered the over-discharge region and supplies power normally, the battery 106 may supply power to the communication circuit 208 through the PNP transistor Q1.

Figure 3:
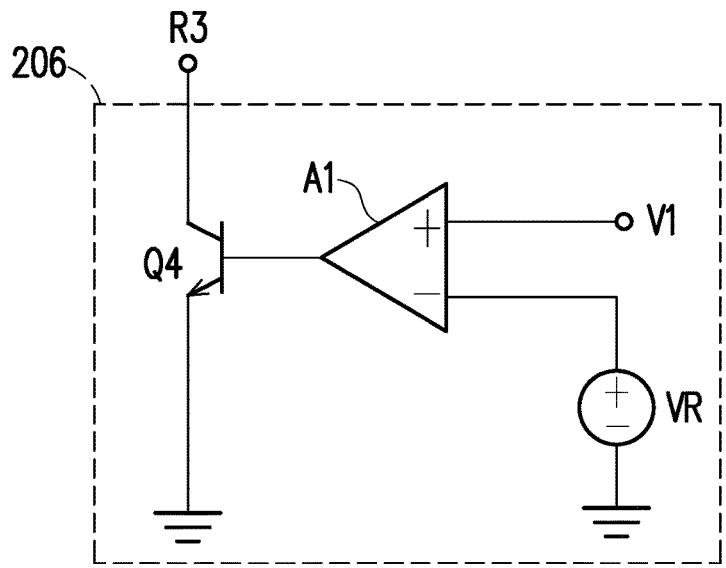
FIG. 3 is a schematic diagram of a three-terminal voltage regulator according to an embodiment of the disclosure.

The voltage-dividing circuit 204 may divide the voltage of the battery 106 to generate a divided voltage V1. In this embodiment, the voltage-dividing circuit 204 may include resistors R1 and R2 connected in series between the battery 106 and a ground. The divided voltage V1 is generated on a common contact between the resistors R1 and R2. The three-terminal voltage regulator 206 may compare the divided voltage V1 with a reference voltage and generate the comparison signal Va at the cathode terminal of the three-terminal voltage regulator 206. Further, the three-terminal voltage regulator 206 may include an NPN transistor Q4 and a comparator A1 as shown in FIG. 3. The comparator A1 has a positive input terminal coupled to an output terminal of the voltage-dividing circuit 204 to receive the divided voltage V1, a negative input terminal coupled to a reference voltage VR, and an output terminal coupled to a base terminal of the NPN transistor Q4. The NPN transistor Q4 has a collector terminal and an emitter terminal respectively coupled to the resistor R3 and a ground. The state of the NPN transistor Q4 is controlled by the comparator A1. When the divided voltage V1 is greater than the reference voltage VR, the comparator A1 turns on the NPN transistor Q4 to pull down a voltage of the comparison signal Va. At this time, the NPN transistor Q2 is controlled by the comparison signal Va and is in the OFF state.

In addition, when the divided voltage V1 is less than the reference voltage VR, the NPN transistor Q4 is in the OFF state, so the comparison signal Va can be maintained at a high voltage level. At this time, the NPN transistor Q2 is controlled by the comparison signal Va to be in the ON state to pull down a voltage of the collector terminal of the NPN transistor Q2. The low voltage of the collector terminal of the NPN transistor Q2 causes the NPN transistor Q3 and the PNP transistor Q1 to enter the OFF state, cutting off a power supply path from the battery 106 to the communication circuit 208. By appropriately designing the resistance values of the resistors R1 and R2 and the voltage value of the reference voltage VR, corresponding predetermined over-discharge voltages may be designed in correspondence to batteries 106 of different specifications. As a result, components such as the voltage-dividing circuit 204, the three-terminal voltage regulator 206, and the NPN transistors Q2 and Q3 may be triggered to turn off the PNP transistor Q1 when the voltage of battery 106 is less than the predetermined over-discharge voltage, to prevent the battery 106 from over-discharging. Since the PNP transistor Q1 and the power switch SW1 are both in the OFF state, the PNP transistor Q1 cannot be turned on even if the voltage of the battery 106 rebounds as the communication circuit 208 stops loading it, preventing the battery 106 from over-discharging, and effectively improving the safety of the battery 106.

In some embodiments, the resistor R2 of the voltage-dividing circuit 204 may be embodied as, for example, a negative temperature coefficient thermistor, and may be disposed beside the battery 106, for example, within $3cm$ from the battery 106, to sense the temperature of the battery 106. When the temperature of the battery 106 is greater than the predetermined temperature, the three-terminal voltage regulator 206 may generate the comparison signal Va at a high voltage level according to the divided voltage V1 on the common contact between the resistor R1 and the resistor R2 to turn on the NPN transistor Q2. Thus, the PNP transistor Q1 is turned off, and the power supply path from the battery 106 to the communication circuit 208 is cut off, preventing the battery 106 from discharging and causing the temperature to continue to increase, and further improving the safety of the battery 106. In addition, in the embodiment of FIG. 2, the resistors R3, R4, and R5 are non-essential components, and may be selectively removed depending on the needs.

Figure 4:
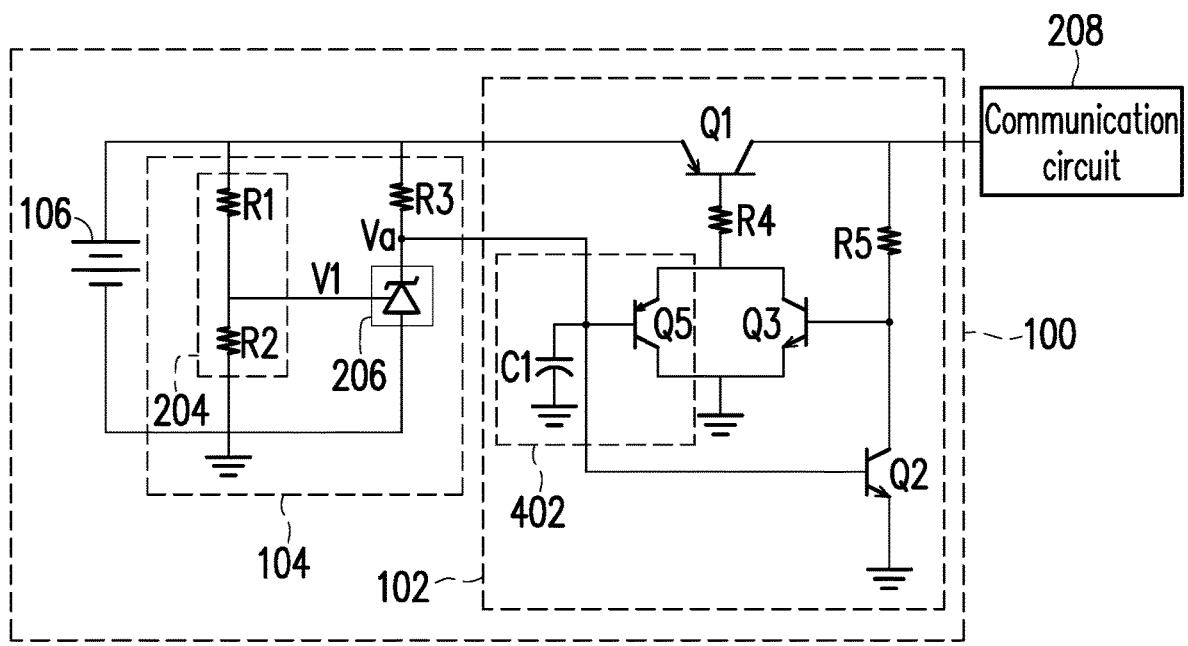
FIG. 4 is a schematic diagram of an IoT device according to another embodiment of the disclosure.

FIG. 4 is a schematic diagram of an IoT device according to another embodiment of the disclosure. The difference between this embodiment and the embodiment of FIG. 2 is that a power supply control circuit 402 of this embodiment is embodied as a PNP transistor Q5 and a capacitor C1, the PNP transistor Q5 has an emitter terminal and a collector terminal respectively coupled to the resistor R4 and a ground, and a base terminal coupled to the output terminal of the comparison circuit 104 (i.e., the cathode terminal of the three-terminal voltage regulator 206), and the capacitor C1 is coupled between the base terminal of the PNP transistor Q5 and a ground. In this embodiment, the comparison signal Va may charge the capacitor C1 and generate the power supply control signal on the capacitor C1. When the battery 106 has not entered the over-discharge region and supplies power normally, the comparison signal Va is at a low voltage level. Therefore, the power supply control signal is also at a low voltage level, so that the PNP transistor Q5 is in the ON state, to thus pull down a voltage of the base terminal of the PNP transistor Q1, and cause the PNP transistor Q1 to enter the ON state. Accordingly, the battery 106 may supply power to the communication circuit 208 through the PNP transistor Q1. At this time, the NPN transistor Q2 is in the OFF state since the comparison signal Va is at a low voltage level. The NPN transistor Q3 is in the ON state since the base terminal of the NPN transistor Q3 is at a high voltage level in response to the PNP transistor Q1 being turned on.

When the voltage of the battery 106 is less than the predetermined over-discharge voltage, the comparison signal Va is changed to a high voltage level, and the power supply control signal is accordingly also changed to a high voltage level to turn off the PNP transistor Q5. In addition, the NPN transistor Q2 enters the ON state in response to the comparison signal Va at a high voltage level, thus pulling down a voltage of the base terminal of the NPN transistor Q3, causing the NPN transistor Q3 to enter the OFF state. In the case where the PNP transistor Q5 and the NPN transistor Q3 are both in the OFF state, the base terminal of the PNP transistor Q1 is changed to a high voltage level, causing the PNP transistor Q1 to enter the OFF state, thus cutting off the power supply path from the battery 106 to the communication circuit 208. Since the capacitor C1 has a high capacitance value (for example but not limited to 10$u$F), the PNP transistor Q5 cannot be turned on even if the voltage of the battery 106 rebounds as the communication circuit 208 stops loading it, preventing the battery 106 from over-discharging again, and effectively improving the safety of the battery 106.

Figure 5:
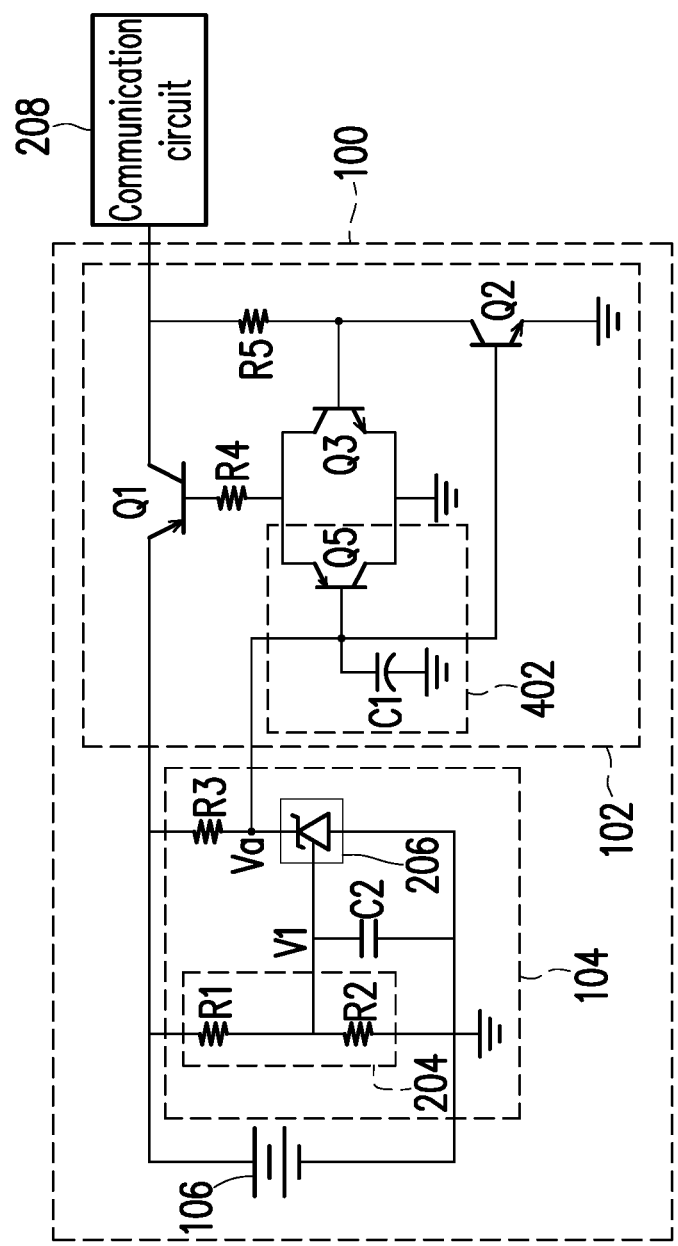
FIG. 5 is a schematic diagram of an IoT device according to still another embodiment of the disclosure.

In some embodiments, the comparison circuit 104 may further include a capacitor configured to prevent a voltage rebound of the voltage of the battery that causes the battery 106 to over-discharge again. For example, FIG. 5 is a schematic diagram of an IoT device according to still another embodiment of the disclosure. In this embodiment, the comparison circuit 104 further includes a capacitor C2.

The capacitor C2 is coupled between a ground and the common contact between the resistor R1 and the resistor R2. Accordingly, when the power supply path from the battery 106 to the communication circuit 208 is cut off, and the voltage of the battery 106 rebounds as the communication circuit 208 stops loading it, the battery 106 needs to additionally charge the capacitor C2. Therefore, it can be ensured that the comparison signal Va is maintained at a high voltage level, preventing the power supply path from the battery 106 to the communication circuit 208 from being turned on again.

In summary of the foregoing, the battery protection circuit of the embodiments of the disclosure may cut off the power supply path from the battery to the load when the voltage of the battery decreases from a value greater than the predetermined over-discharge voltage to a value less than the predetermined over-discharge voltage, and does not turn on the power supply path when the voltage of the battery rebounds back above the predetermined over-discharge voltage. This effectively prevents the battery from over-discharging again, and effectively improves the safety of the battery. In some embodiments, the battery protection circuit may also cut off the power supply path from the battery to the load when the temperature of the battery is greater than the predetermined temperature, further improving the safety of the battery.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery power supply circuit, comprising:
  a battery;
  a comparison circuit coupled to the battery and comparing a voltage of the battery with a predetermined over-discharge voltage to generate a comparison signal, wherein the comparison circuit comprises:
    a voltage-dividing circuit coupled to the battery and dividing the voltage of the battery to generate a divided voltage; and
    a three-terminal voltage regulator having a cathode terminal and an anode terminal respectively coupled to an output terminal of the comparison circuit and a ground, and having a reference terminal coupled to the divided voltage, wherein the three-terminal voltage regulator compares the divided voltage with a reference voltage, and generates the comparison signal at the output terminal of the comparison circuit; and
  a battery protection circuit coupled to the battery and the comparison circuit, wherein the battery protection circuit comprises:
    a first PNP transistor having an emitter terminal and a collector terminal respectively coupled to the battery and a load;
    a first NPN transistor having a collector terminal and an emitter terminal respectively coupled to a base terminal of the first PNP transistor and the ground;
    a second NPN transistor having a collector terminal and an emitter terminal respectively coupled to the collector terminal of the first PNP transistor and the ground, and having a base terminal coupled to the cathode terminal of the three-terminal voltage regulator; and a power supply control circuit coupled to the base terminal of the first PNP transistor, and turning on the first PNP transistor according to a power supply control signal, wherein the first NPN transistor turns off the first PNP transistor in response to the voltage of the battery being less than the predetermined over-discharge voltage, wherein the battery protection circuit serves as a power supply path from the battery to the load and determines whether to cut off the power supply path according to the comparison signal, wherein the battery protection circuit cuts off the power supply path from the battery to the load when the voltage of the battery decreases from a value greater than the predetermined over-discharge voltage to a value less than the predetermined over-discharge voltage, but does not turn on the power supply path when the voltage of the battery increases from a value less than the predetermined over-discharge voltage to a value greater than the predetermined over-discharge voltage.

2. The battery power supply circuit according to claim 1, wherein the power supply control circuit comprises:
a second PNP transistor having an emitter terminal and a collector terminal respectively coupled to the base terminal of the first PNP transistor and the ground, and having a base terminal coupled to the cathode terminal of the three-terminal voltage regulator; and
a capacitor coupled between the base terminal of the second PNP transistor and the ground.

3. The battery power supply circuit according to claim 2, wherein the voltage-dividing circuit comprises:
a first resistor having a first terminal coupled to the battery; and
a second resistor coupled between a second terminal of the first resistor and the ground, wherein a common contact between the first resistor and the second resistor is coupled to the reference terminal of the three-terminal voltage regulator, and the second resistor is a negative temperature coefficient thermistor.

4. The battery power supply circuit according to claim 1, wherein the three-terminal voltage regulator comprises:
a comparator having a positive terminal and a negative terminal respectively coupled to the voltage-dividing circuit and the reference voltage; and
a transistor coupled between the output terminal of the comparison circuit and the ground, having a control terminal coupled to an output terminal of the comparator, and being turned on by the comparator when the divided voltage is greater than the reference voltage.

5. The battery power supply circuit according to claim 1, wherein the comparison circuit further comprises:
a capacitor coupled between an output terminal of the voltage-dividing circuit and the ground.

6. An Internet of things (IoT) device, comprising:
a communication circuit; and
a battery power supply circuit supplying power to the communication circuit, wherein the battery power supply circuit comprises:
a battery;
a comparison circuit coupled to the battery and comparing a voltage of the battery with a predetermined over-discharge voltage to generate a comparison signal, wherein the comparison circuit comprises:
a voltage-dividing circuit coupled to the battery and dividing the voltage of the battery to generate a divided voltage; and a three-terminal voltage regulator having a cathode terminal and an anode terminal respectively coupled to an output terminal of the comparison circuit and a ground, and having a reference terminal coupled to the divided voltage, wherein the three-terminal voltage regulator compares the divided voltage with a reference voltage, and generates the comparison signal at the output terminal of the comparison circuit; and
a battery protection circuit coupled to the battery and the comparison circuit, wherein the battery protection circuit comprises:
a first PNP transistor having an emitter terminal and a collector terminal respectively coupled to the battery and the communication circuit;
a first NPN transistor having a collector terminal and an emitter terminal respectively coupled to a base terminal of the first PNP transistor and the ground;
a second NPN transistor having a collector terminal and an emitter terminal respectively coupled to the collector terminal of the first PNP transistor and the ground, and having a base terminal coupled to the cathode terminal of the three-terminal voltage regulator; and
a power supply control circuit coupled to the base terminal of the first PNP transistor, and turning on the first PNP transistor according to a power supply control signal, wherein the first NPN transistor turns off the first PNP transistor in response to the voltage of the battery being less than the predetermined over-discharge voltage, wherein the battery protection circuit serves as a power supply path from the battery to the communication circuit and determines whether to cut off the power supply path according to the comparison signal, wherein the battery protection circuit cuts off the power supply path from the battery to the communication circuit when the voltage of the battery decreases from a value greater than the predetermined over-discharge voltage to a value less than the predetermined over-discharge voltage, but does not turn on the power supply path when the voltage of the battery increases from a value less than the predetermined over-discharge voltage to a value greater than the predetermined over-discharge voltage.

7. The IoT device according to claim 6, wherein the power supply control circuit comprises:
a second PNP transistor having an emitter terminal and a collector terminal respectively coupled to the base terminal of the first PNP transistor and the ground, and having a base terminal coupled to the cathode terminal of the three-terminal voltage regulator; and
a capacitor coupled between the base terminal of the second PNP transistor and the ground.

8. The IoT device according to claim 7, wherein the voltage-dividing circuit comprises:
a first resistor having a first terminal coupled to the battery; and
a second resistor coupled between a second terminal of the first resistor and the ground, wherein a common contact between the first resistor and the second resistor is coupled to the reference terminal of the three-terminal voltage regulator, and the second resistor is a negative temperature coefficient thermistor.

9. The IoT device according to claim 6, wherein the three-terminal voltage regulator comprises:

a comparator having a positive terminal and a negative terminal respectively coupled to the voltage-dividing circuit and the reference voltage; and a transistor coupled between the output terminal of the comparison circuit and the ground, having a control terminal coupled to an output terminal of the comparator, and being turned on by the comparator when the divided voltage is greater than the reference voltage.

10. The IoT device according to claim 6, wherein the comparison circuit further comprises:

a capacitor coupled between an output terminal of the voltage-dividing circuit and the ground.

* * * * *